United States Patent
Fiala

[15] 3,648,465
[45] Mar. 14, 1972

[54] IRRIGATION SYSTEM

[72] Inventor: Roger William Fiala, P.O. Box 169, Jerome, Idaho 83338

[22] Filed: Dec. 11, 1968

[21] Appl. No.: 783,063

[52] U.S. Cl. .................................. 61/12, 47/48.5, 61/29
[51] Int. Cl. ................................. E02b 13/00, E02b 3/00
[58] Field of Search ...................... 61/12, 13, 10, 11, 29; 47/48.1

[56] References Cited

UNITED STATES PATENTS

| | | | |
|---|---|---|---|
| 1,041,509 | 10/1912 | Petrie | 61/12 |
| 1,591,453 | 7/1926 | Heermans | 61/12 |
| 3,429,125 | 2/1969 | Shotton | 61/12 |

*Primary Examiner*—Jacob Shapiro
*Attorney*—John E. Benoit

[57] ABSTRACT

A substantially solid structure to be placed in the ground adjacent a water reservoir, the structure having a plurality of holes with their centers along a straight line. Pipes are inserted in the holes and extend outwardly from the structure away from the reservoir. The structure is placed in the ground so that the holes are horizontal with respect to the waterline level of the reservoir.

4 Claims, 4 Drawing Figures

PATENTED MAR 14 1972

INVENTOR
ROGER W. FIALA

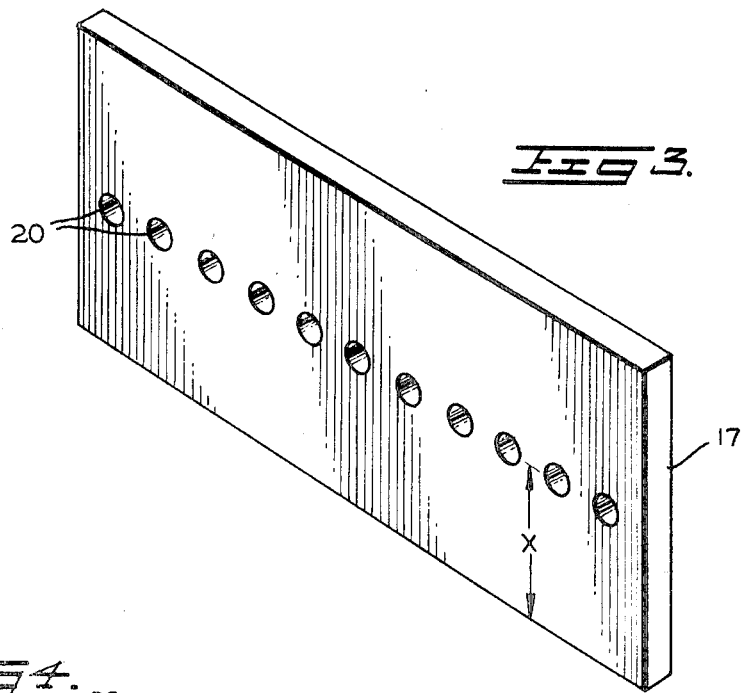
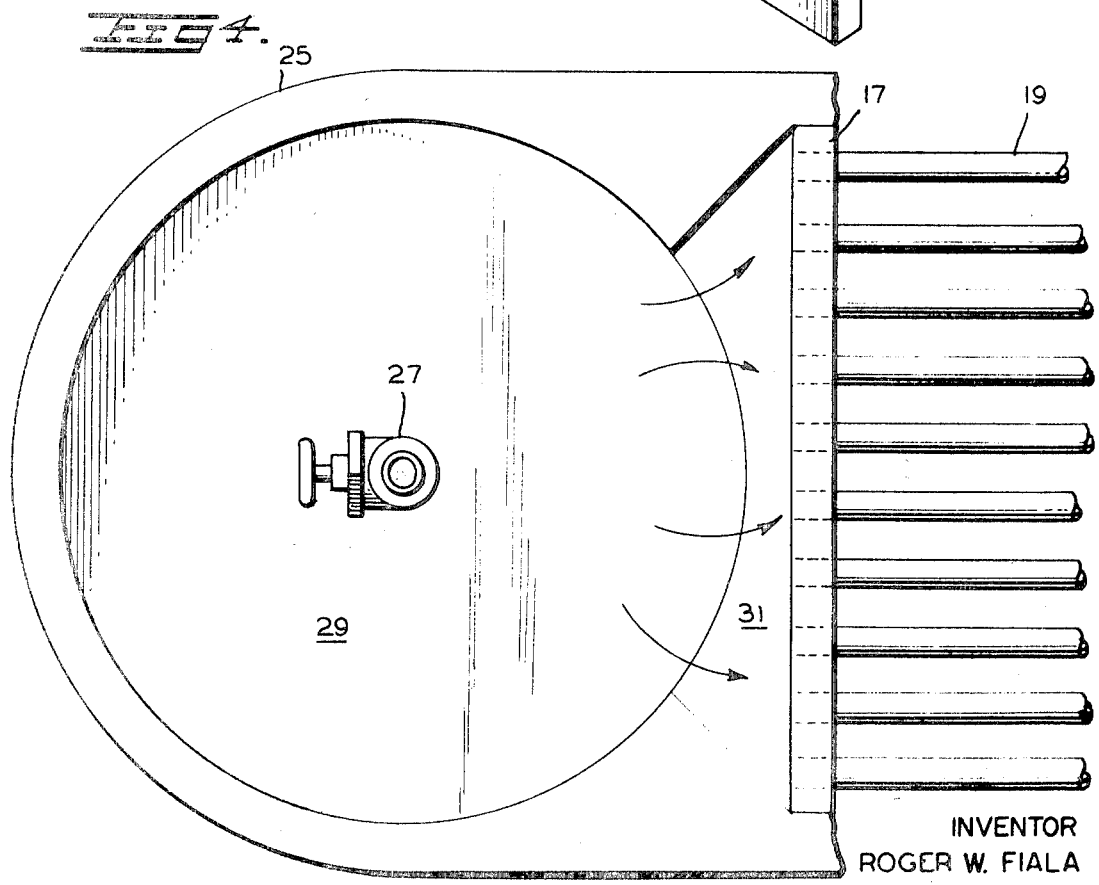

IRRIGATION SYSTEM

The present invention relates generally to irrigation systems and more specifically to a structure for automatically regulating irrigation system.

The most commonly known system used for irrigating in arid areas is that of providing a main ditch supplied from a canal or other primary water source. This ditch normally flows perpendicular to a plurality of parallel individual furrows which extend downgrade from the primary ditch. A cut is made in the main ditch to supply a secondary or feed ditch running parallel to the main ditch and connecting to the head of each of the individual furrows. Therefore, the control or regulation to each of the furrows is accomplished from the feed ditch.

With the above type of irrigation system, the major problem which occurs is one of supplying an equal amount of water to each of the individual furrows, since the furrow closest to the opening of the main ditch will obviously receive more water than will the furrow which is at the far end of the feed ditch.

Numerous solutions have been proposed in order to avoid this unequal water distribution problem. Among the solutions are individually gated structures supplying individual furrows, movable structures for removing water from the main ditch and supplying same to the furrows, and various other valve and gated structures. Such structures are normally too costly and/or cumbersome to be of a practical value.

Accordingly, it is an object of this invention to provide a simplified irrigation system for automatically regulating an equal amount of water to each individual furrow.

Another object of this invention is to provide structure for automatically regulating the supply of water to the irrigation furrows which may be installed permanently and which has no moving parts.

Yet another object of this invention is to supply an automatic regulating structure which is substantially below ground level and, accordingly, away from harmful exterior effects.

These and other objects will become obvious from the following description when taken in conjunction with the drawings wherein:

FIG. 3 is a perspective view of the basic rigid structure used in the present invention; and FIG. 4 is a plan view showing the structure used with a well-type irrigation system.

Figure 1:
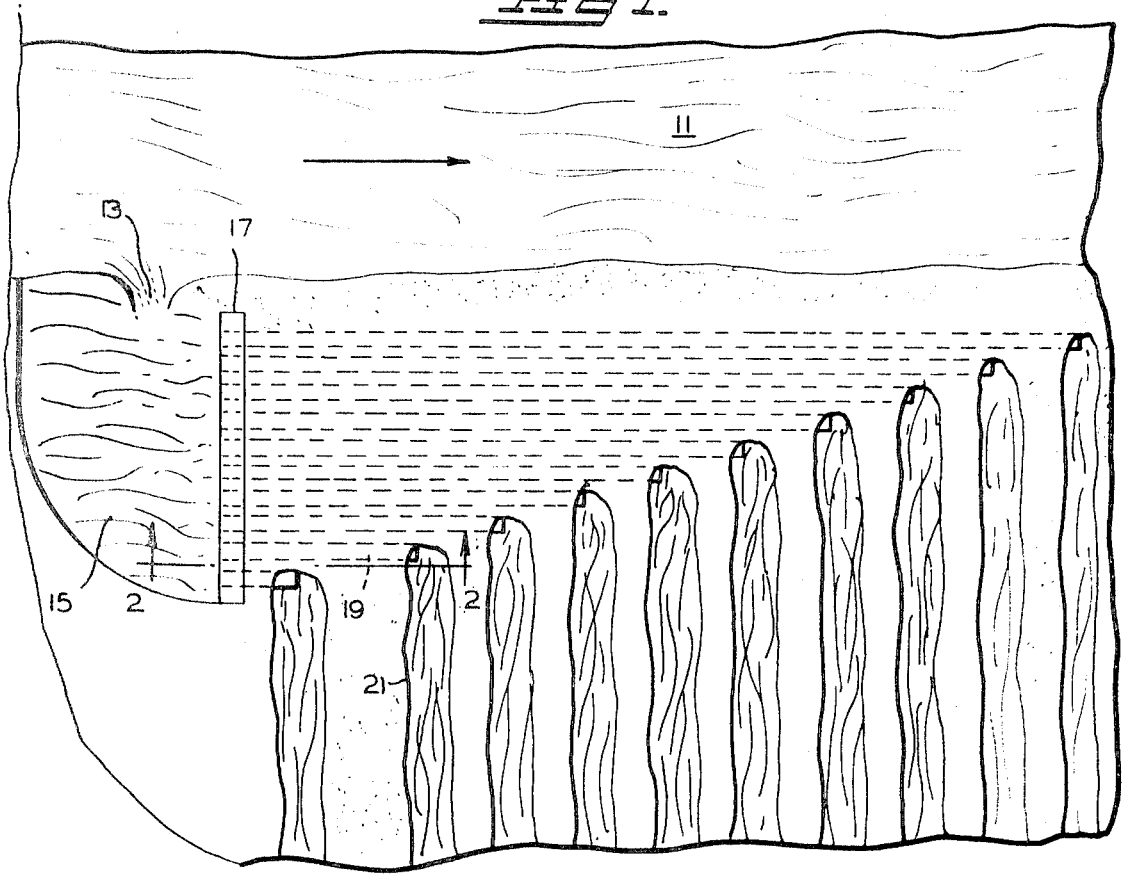
FIG. 1 is a general plan view illustrative of the basic operation of the present invention.

Broadly, the present invention consists of a means for supplying water to a plurality of individual furrows from a reservoir which comprises a rigid structure having a plurality of boreholes therethrough with the boreholes lying along a substantially horizontal level line. This structure is mounted in the ground with the top thereof substantially level with the ground so that the center of the boreholes extend along a substantially horizontal line which is level with the reservoir waterline. Individual pipes extend outwardly from the boreholes opposite from the reservoir to individual furrows. Because of the waterline level position of the boreholes, each of the pipes receives an equal amount of water and, therefore, so does each individual furrow.

Turning now more specifically to the drawings, there is illustrated a main ditch 11 which is supplied by means such as a canal or other main water system (not shown). A cut 13 is made in the bank of the main ditch 11 so as to supply a reservoir area 15. A rigid structure 17, which may be substantially flat and of a material such as concrete, is set into the ground, preferably with the top thereof substantially at ground level as is shown more clearly in FIG. 2. A plurality of pipes 19 extend outwardly from rigid structure 17 to individual furrows 21. It will be obvious that the furrows extend downgrade from the main ditch in the normal fashion.

Figure 2:
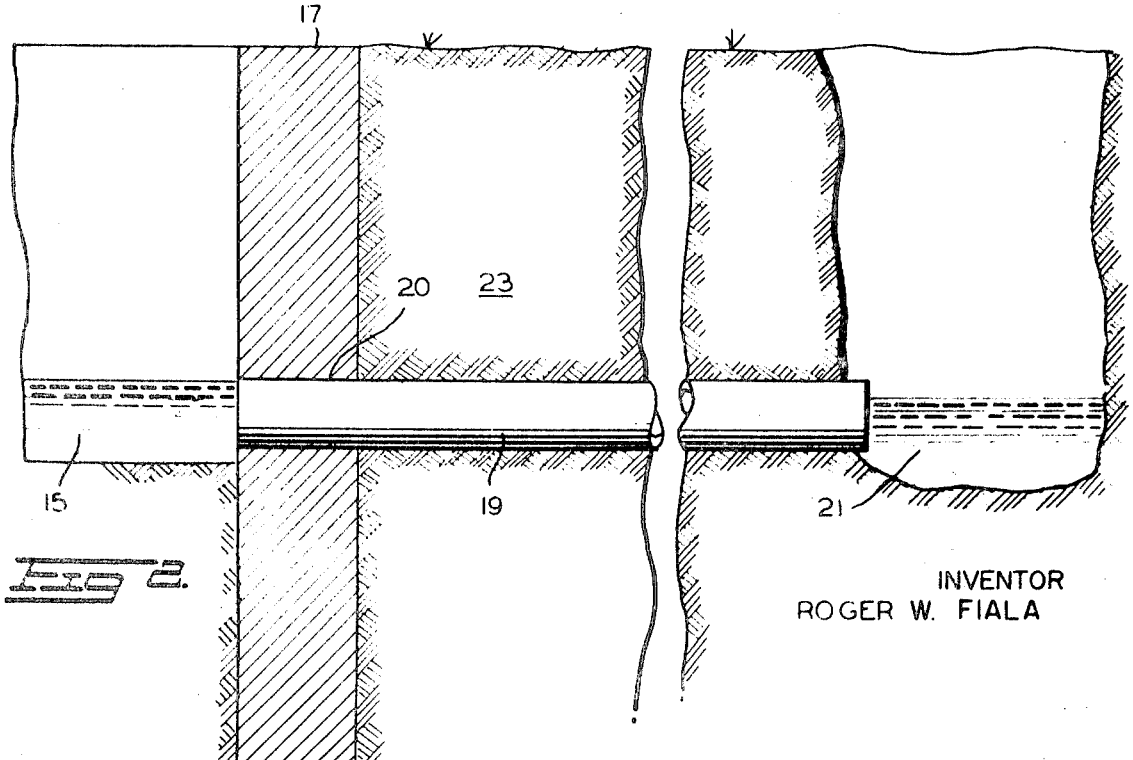
FIG. 2 is a view taken along the lines 2—2 of FIG. 1.

As shown in FIG. 2, the pipes 19 extend underground to the point of termination at the individual furrows 21.

One of the rigid structures 17 is shown in FIG. 3. It will be seen that the boreholes 19 in rigid structure 17 extend along a straight line whereby distance X between the base of the structure and the centerline through the boreholes is substantially constant so that when the structure 17 is mounted in the ground, it may initially be set so as to assure that the boreholes are horizontal with respect to the water level surface.

Since the boreholes 20 are horizontal to the water surface level, it will be obvious that each individual pipe 19 which is fit within the individual boreholes will receive substantially the same amount of water from the reservoir and, therefore, each individual furrow will receive substantially the same amount of water during the irrigation period. The individual pipes 19 may be of any material; however, a flexible material such as plastic is preferable in order to provide an ease of arrangement during the installation thereof.

The amount of water which is desired for each furrow will ultimately determine the size of the boreholes and the size of the pipe to be used in delivering the water to the furrows. It will be obvious that the above described structure eliminates the need of any further regulation such as individual valves in order to assure that each furrow will receive equal amounts of water from each individual pipe.

FIG. 4 shows the basic rigid structure 17 and pipes 19 adapted for use with a well 29 and valve 27 which are used in underground pipeline systems in irrigation areas. The well wall 25 contains the water within the main well 29 and overflows into the supply area 31. Again, the rigid structure 17 is adjusted in the ground so that the various boreholes are in a line horizontal with the water level so as to provide the equal distribution described above.

It will be obvious that the number of rigid structures and associated pipes used will depend upon the number of furrows to be serviced. As an example, if the individual furrows are 34 inches apart and the basic rigid structure accommodates 10 pipes, then a rigid structure would be required approximately at 27 foot intervals. With this being a semipermanent structure and with the plastic lines buried approximately 4 inches below the earth's surface, there will be no open ditches and there will be very little likelihood of any damage to any of the piping.

The above description and drawings are illustrative only and various modifications could be made in the physical structure without departing from the basic concepts of the invention. Accordingly, my invention is to be limited only by the scope of the following claims.

I claim:

1. An irrigation system for supplying water to a plurality of individual furrows from a reservoir comprising
    a rigid structure mounted in the ground adjacent said reservoir,
    a plurality of boreholes through said structure, said boreholes extending along a line substantially parallel to said furrows and lying along a line substantially horizontal with the water level line, and
    a pipe within each of said boreholes extending outwardly therefrom and away from said reservoir to one of said individual furrows,
    each of said pipes extending substantially transversely to the direction of said individual furrows, and
    each of said pipes being of a progressively greater length so as to terminate at different furrows.

2. The system of claim 1 wherein said rigid structure is a substantially flat plate having its upper edge substantially at ground level.

3. The system of claim 1 wherein said pipes are of a flexible material and are force fitted within said boreholes.

4. The system of claim 1 wherein said boreholes are below ground level and said pipes extend below ground level to said furrows.

* * * * *